July 13, 1954

W. P. SCHMITTER 2,683,848

OVERLOAD CONTROL FOR MOTORS

Filed April 12, 1951

INVENTOR.
Walter P. Schmitter
BY Eugene B. Simpson
Attorney

July 13, 1954
W. P. SCHMITTER
2,683,848
OVERLOAD CONTROL FOR MOTORS
Filed April 12, 1951
2 Sheets-Sheet 2
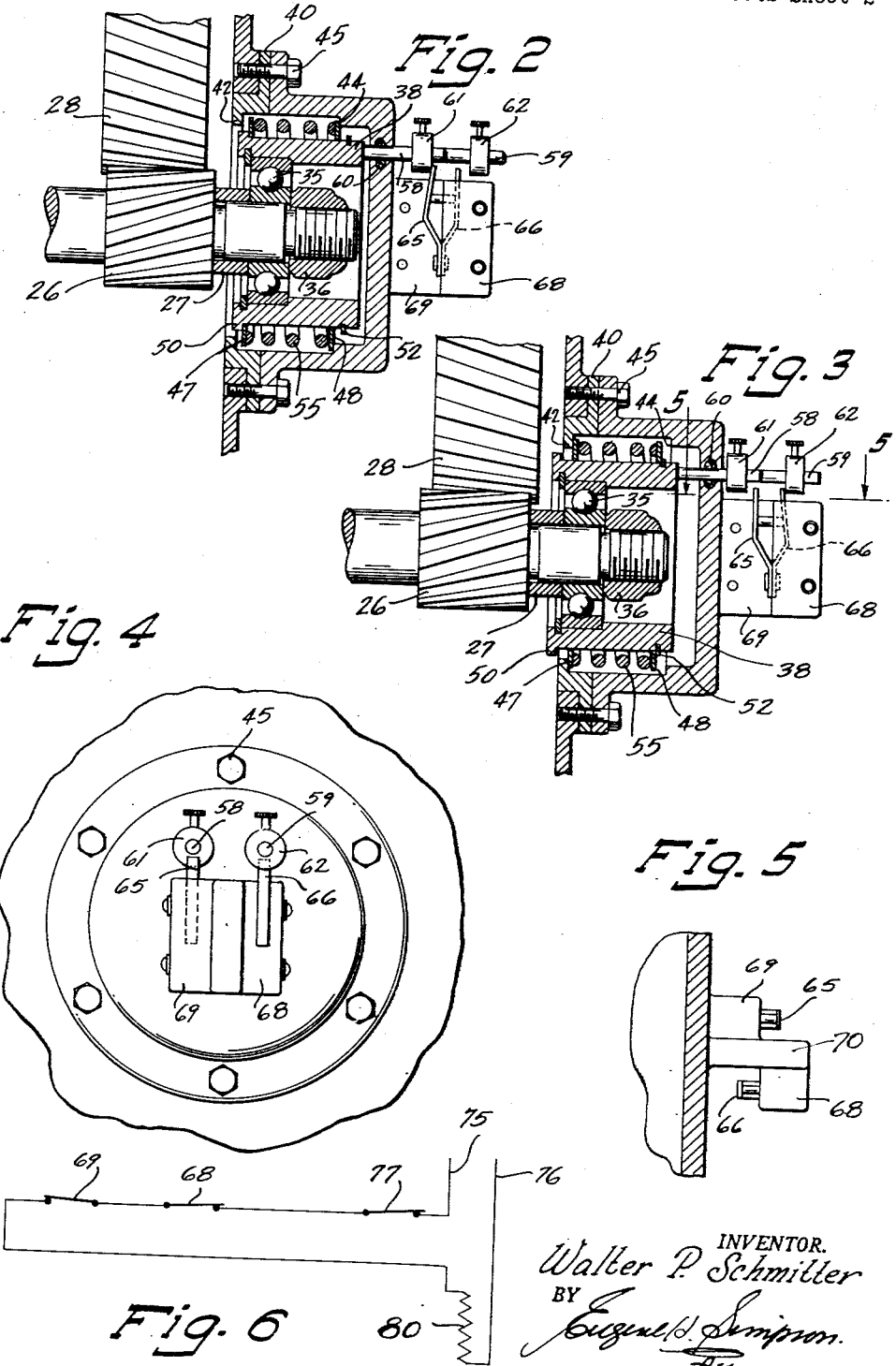
INVENTOR.
Walter P. Schmitter
BY
Eugene H. Simpson
Attorney Patented July 13, 1954

2,683,848

UNITED STATES PATENT OFFICE 2,683,848

OVERLOAD CONTROL FOR MOTORS

Walter P. Schmitter, Milwaukee, Wis., assignor to The Falk Corporation, Milwaukee, Wis., a corporation of Wisconsin Application April 12, 1951, Serial No. 220,614

8 Claims. (Cl. 318—475)

This invention relates to motor controls and more particularly to an overload control for use in conjunction with a speed changer, or the like.

In operating electric motors it is customary to interpose a speed changer or transmission between the motor and the driven element. In such systems the motor sometimes becomes overloaded which condition may not be noticed immediately and the motor may burn out necessitating expensive repairs.

It is an object of the present invention to protect the motor against overloading.

Another object of the invention is to provide an improved overload control responsive to the load imposed on the motor.

A further object is to provide an overload control responsive to the load on the gear teeth.

A further object is to provide a motor transmission or speed reducer with an overload cutout responsive to movement of an element of the transmission.

A further object is to provide an overload control which is economical to manufacture.

A still further object of the invention is to provide an overload control which is positive and accurate.

A still further object is to provide an overload control adapted to control the motor through the starter holding coil.

A still further object is to provide a motor control responsive to axial movement of a countershaft.

Still further objects will become apparent upon considering the following specification, which, when taken in conjunction with the accompanying drawings illustrates a preferred form of the invention.

In the drawings:

Figs. 2 and 3 are elevational cross-sectional views of the overload control similar to Fig. 1, but showing the limit switches actuated for overload of the motor both forward and reverse;

Fig. 4 is an end elevational view of the overload control showing the location of the switches;

Fig. 5 is a top plan view of the overload control showing the location of the switches; and Fig. 6 is a wiring diagram of the overload control.

Figure 1:
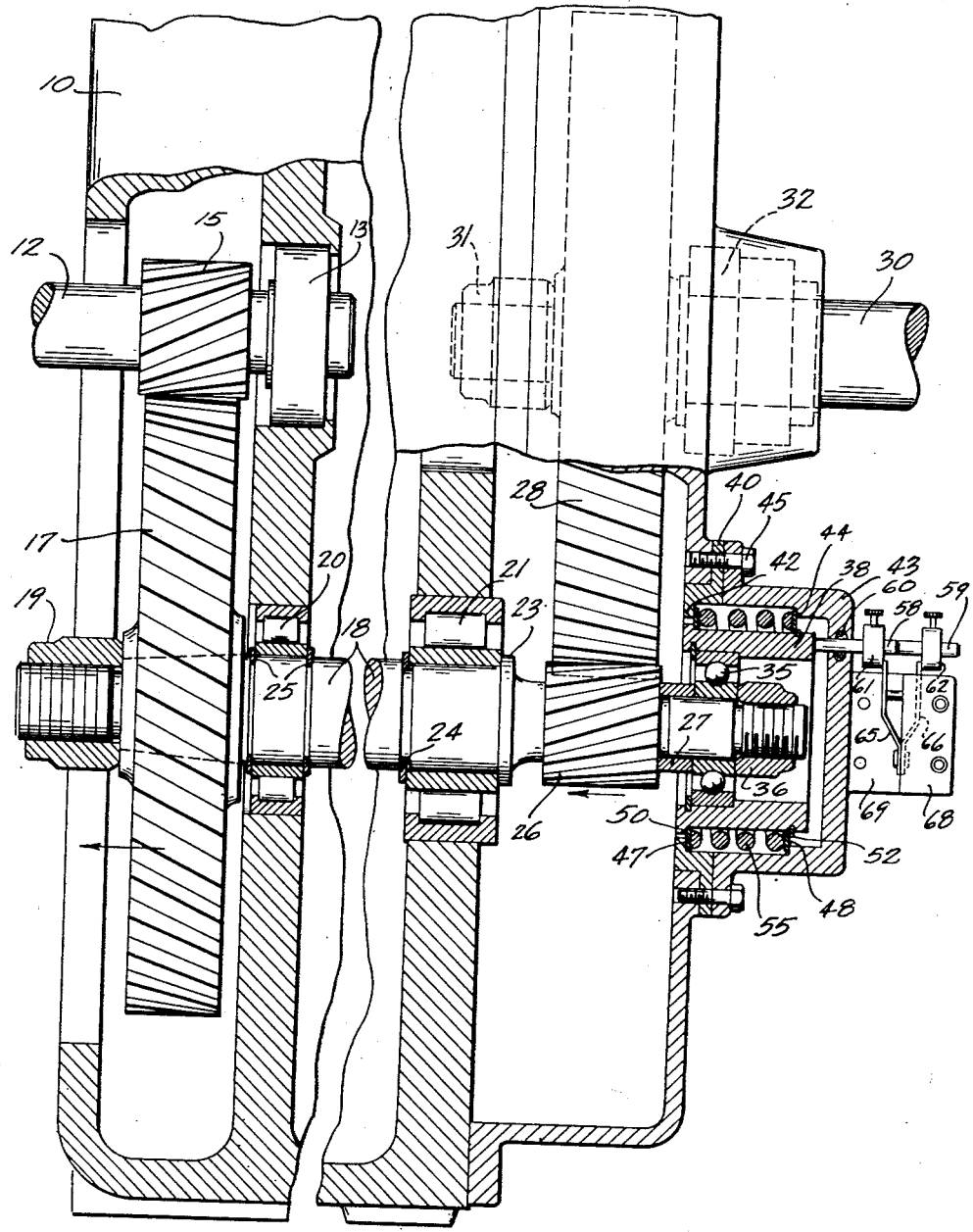
Fig. 1 is an elevational view partly in cross-section through a speed changer, illustrating the principles of the present invention.

Referring to the drawings, the speed changer has a casing 10 in which a shaft 12 may be supported in a bearing 13. A second bearing (not shown) for the shaft 12 may be mounted in a motor or other power source or may be an outboard bearing mounted on the casing 10. A helical gear 15 may be fixed on the shaft 12 to be rotated thereby. The gear 15 meshes with a helical gear 17 carried on a countershaft 18. The gear 17 may be retained on the countershaft by means of a nut 19, screw-threaded on the end of the shaft 18, or by other convenient means.

Due to the slope of the gear teeth of the helical gears 15 and 17 the rotation of the gear 17 by the gear 15 transmits not merely a tangential force between the gears but creates an axial force parallel to the axis of the shaft 18, tending to move the shaft 18 to the right or left depending both upon the direction of rotation of the gears 15 and 17 and upon the slope of the teeth of the gears.

The countershaft 18 may be mounted in bearings 20 and 21 which preferably are roller bearings to allow for free drift of the countershaft 18 in the casing 10 due to the force created parallel to the axis of the countershaft 18 by the rotation of the helical gears 15 and 17.

The inner race of the bearing 21 may be held in position on the shaft 18 between an outstanding annular shoulder 23 and a snap ring 24. In a similar manner the inner race of the bearing 20 may be held in position by a pair of snap rings 25—25.

A helical gear 26 is mounted on the countershaft 18 and is held in proper position against a shoulder (not shown) by a spacer ring 27. The gear 26 engages and drives a helical gear 28 which is fixed on a shaft 30, the shaft 30 being the main driven shaft of the speed changer. The gear 28 is secured on the shaft 30 by a nut 31 screw-threaded on the end of the shaft 30. The shaft 30 may be mounted in the casing in one or more bearings 32, and may be connected to any machine it may be desired to drive or it may constitute the drive shaft of that machine.

The slope of the teeth of the helical gears 26 and 28 is such as to augment the effect of the gears 15 and 17 tending to move the shaft 18 axially in its bearings 20 and 21. A ball bearing 35 is mounted on the outer end of the shaft 18 and is held in place thereon between the spacer ring 32 and a nut 36 screw-threaded on the end of the shaft 18. The bearing 35 is adapted to transmit thrust due to movement of the shaft 18 to a sleeve 38 carried on the outer race of the bearing 35 so that axial movement in the shaft 18 effects similar movement of the sleeve 38.

The sleeve 38 projects into a chamber composed of an annular ring 40 having a Z-shaped cross-section defining an annular shoulder 42 on the inner end of the chamber and a cup-like cap 43 having an annular shoulder 44 facing the shoulder 42 and being substantially the same inside diameter. Machine screws 45 pass through both the ring 40 and an outstanding flange on the cap 43 to secure both the annular ring 40 and the cap 43 to the edge of an aperture in the side of the casing 10.

A pair of annular rings 47 and 48 are mounted in the chamber formed by the annular ring 40 and cap 43 and abut the shoulders 42 and 44, respectively. The rings 47 and 48 are received on the exterior of the sleeve 38, with the ring 47 abutting a shoulder 50 on the sleeve 38 and the ring 48 retained on the sleeve 38 by a snap ring 52.

A spring 55 is mounted between the rings 47 and 48 and is given an initial compression equal to the axial force transmitted by the gears 15—17 and 26—28 parallel to the axis of the shaft 18 under full load conditions of the motor. It will be noted that the sleeve 38 does not rotate but that the shaft 18 rotates within the sleeve.

The sleeve 38 has a pair of rods 58 and 59 formed on the outer end of the sleeve either by welding or other suitable means. The rods 58 and 59 project through holes in the cap 43 and have packings 60 surrounding them to prevent leakage of oil. The rods 58 and 59 have arms 61 and 62 secured on or near the outer ends of the rods 58 and 59, respectively. The arms 61 and 62 contact the actuating levers 65 and 66 of micro or limit switches 68 and 69, respectively. The switches 68 and 69 are fixed to an ear 70 formed on the outer face of the cap 43.

*Operation*

In operation the motor (not shown) is controlled by a starter box (not shown), the starter box including a holding coil 80 adapted, when energized, to retain the starting switch closed.

Upon starting the motor the current flows through the line 75—76 (Fig. 6), through the limit switches 68 and 69, both of which are normally closed, and through the normally closed stop switch 77 on the starter box, to energize the holding coil 80 and hold the main motor switch (not shown) closed.

As the motor runs, it drives the helical gear 15 which is in constant mesh with the helical gear 17 to drive it. Due to the angle between the teeth of the gears 15 and 17 there is a force exerted axially on the countershaft tending to move the shaft axially in the bearings 20 and 21. This thrust on the countershaft is augmented by a similar thrust created by the helical gears 26 and 28.

The thrust of the countershaft 18 is counteracted by the spring 55 which has an initial compression equal to the thrust developed by both sets of gears 15—17 and 26—28 under maximum normal load.

As the thrust from the gears 15—17 and 26—28 develops it is transmitted through the countershaft 18, through the ball bearing 35 to the sleeve 38.

The spring 55 acting through the rings 47 and 48 retain the sleeve 38 in fixed axial position until the thrust exceeds the load capacity for the motor. When the thrust exceeds the load capacity for the motor the thrust exceeds the weight of the spring causing the countershaft to move the sleeve 38 neither to the right or to the left further compressing the spring until the system is again in balance.

Moving the sleeve to the right causes both rods 58 and 59 to move to the right, as seen in Fig. 2, causing the arm 61 to actuate the switch 68 to open that switch and break the circuit to the motor holding coil 80. Breaking the circuit to the motor holding coil 80 de-energizes coil 80 and stops the motor and shuts down the machinery.

Movement of the sleeve 38 to the left moves both rods 58 and 59 to the left, as seen in Fig. 3, actuating the switch 69 to open the circuit to the holding coil 80 and stopping the motor.

When the motor (not shown) is stopped the spring 55 returns the gears 17 and 26 and the countershaft 18 to its neutral position with the gears 17 and 26 centered on the gears 15 and 28.

In the above described construction there has been provided a relatively simple overload control adapted to shut down the motor in the event of an overload in either forward or reverse drive, which control is economical to manufacture and positive in action.

It will be understood that the herein described form of the invention is to be taken merely as a preferred embodiment thereof and that various changes in size, shape and arrangement of parts may be employed without departing from the spirit of the invention or the scope of the subjoined claims.

That which is claimed as new and is desired to be secured by United States Letters Patent is:

1. In an overload control for a motor driven speed changer, said speed changer comprising, a countershaft mounted for rotational and limited axial movement in said speed changer, a first helical cut gear in said speed changer, a second helical cut gear driven by said first named gear, said second gear forming a driving member for said shaft and transmitting an axial thrust to said shaft in direct proportion to the load being transmitted through said gears, means to resist said force to hold the shaft against axial movement for normal loads on the speed changer and to permit limited axial movement of the shaft for overloads on the speed changer, and a motor control switch actuated by axial movement of the shaft.

2. In an overload control for a motor driven speed changer, said speed changer comprising, a countershaft mounted for rotational and limited axial movement in said speed changer, a first helical cut gear in said speed changer, a second helical cut gear driven by said first named gear, said second gear forming a driving member for said shaft and transmitting an axial thrust to said shaft in direct proportion to the load being transmitted through said gears, means to resist said force to hold the shaft against axial movement for normal loads on the speed changer and to permit limited axial movement of the shaft for overloads on the speed changer, a normally closed limit switch mounted adjacent said shaft, and means actuated by the axial movement of the shaft to open the limit switch to stop the speed changer upon a predetermined movement of the shaft.

3. In a transmission, a casing having an aperture in one side thereof, a housing surrounding said aperture, said housing providing a cavity, a shoulder at one end of said cavity, a shoulder at the opposite end of said cavity, a driving shaft projecting into said cavity, a thrust bearing mounted on the end of said shaft, a sleeve carried by said bearing and projecting into said cavity, said sleeve being adapted for axial movement in said cavity, a shoulder formed on the forward end of said sleeve, a shoulder formed on the rear end of said sleeve, a ring mounted between the forward shoulders of said sleeve and said cavity, a second ring mounted between the rear shoulders of the sleeve and cavity, a pre-compressed spring mounted between said rings, means on the shaft to transmit torque and to exert an axial force in proportion to the amount of torque being transmitted whereby axial force is transmitted through said bearing to move the sleeve, and means connected to the sleeve to actuate a switch.

4. In a transmission, a casing having an aperture in one side thereof, a housing surrounding said aperture, said housing providing a cavity, a shoulder at one end of said cavity, a shoulder at the opposite end of said cavity, a driving shaft projecting into said cavity, a thrust bearing mounted on the end of said shaft, a sleeve carried by said bearing and projecting into said cavity, said sleeve being adapted for axial movement in said cavity, a shoulder formed on the forward end of said sleeve, a shoulder formed on the rear end of said sleeve, a ring mounted between the forward shoulders of said sleeve and said cavity, a second ring mounted between the rear shoulders of the sleeve and cavity, a pre-compressed spring mounted between said rings, means on the shaft to transmit torque and to exert an axial force in proportion to the amount of torque being transmitted whereby axial force is transmitted through said bearing to move the sleeve, means connected to the sleeve to actuate a switch when said sleeve is moved in one direction, and means connected with the sleeve to actuate a second switch when the sleeve is moved in the opposite direction.

5. In a transmission, a casing having an aperture in one side thereof, a housing surrounding said aperture, said housing providing a cavity, a shoulder at one end of said cavity, a shoulder at the opposite end of said cavity, a driving shaft projecting into said cavity, a thrust bearing mounted on the end of said shaft, a sleeve carried by said bearing and projecting into said cavity, said sleeve being adapted for axial movement in said cavity, a shoulder formed on the forward end of said sleeve, a shoulder formed on the rear end of said sleeve, a ring mounted between the forward shoulders of said sleeve and said cavity, a second ring mounted between the rear shoulders of the sleeve and cavity, a pre-compressed spring mounted between said rings, means on the shaft to transmit torque and to exert an axial force in proportion to the amount of torque being transmitted whereby axial force is transmitted through said bearing to move the sleeve, and means operable upon a predetermined torque on the shaft to actuate a switch.

6. In a transmission, a casing, a power intake shaft mounted in said casing, a helical gear on said shaft, a power delivery shaft mounted in said casing parallel to said intake shaft, a second gear fixed on said last named shaft, a countershaft parallel to said intake shaft, means to mount said countershaft for rotational and limited axial movement in said casing, a helical gear on said countershaft in engagement with said first named helical gear, a gear on the countershaft in engagement with said second gear, whereby a thrust is created on the countershaft in proportion to the power transmitted, and means operable upon a predetermined thrust of said countershaft to actuate a cut off switch.

7. In an overload control for a motor driven speed changer, said speed changer comprising a countershaft mounted for rotational and limited axial movement, a pair of intermeshing load transmitting helical gears, one of said gears being fixed to said shaft and imposing thereon an axial thrust proportional to the load being transmitted through said gears, means reacting on said shaft to oppose said thrust and to resist axial movement thereof during normal loads, said last named means being yieldable under overload to permit limited axial movement of said shaft, and a motor control switch responsive to said limited axial movement of said shaft to thereby de-energize the speed changer in the event of overload.

8. In an overload control for a motor driven speed changer, said speed changer including a pair of parallel torque transmitting rotary shafts one of which is axially movable, means including a pair of load transmitting helical gears connecting said shafts in driving relation, one of said gears being fixed to said axially movable shaft and imposing thereon an axial thrust proportional to the transmitted load, means reacting on said last named shaft to yieldably resist axial movement thereof under the axial thrust thus imposed thereon, and a motor control switch responsive to axial movement of said last named shaft to thereby de-energize the speed changer in the event of overload.

References Cited in the file of this patent

UNITED STATES PATENTS

| Number | Name | Date |
| --- | --- | --- |
| 1,779,480 | Loomis | Oct. 28, 1930 |
| 1,996,312 | Tremolada | Apr. 2, 1935 |
| 2,086,030 | Hodgson et al. | July 6, 1937 |
| 2,222,716 | Mageoch | Nov. 26, 1940 |
| 2,387,047 | Weiss | Oct. 16, 1945 |